Oct. 9, 1945. N. H. IVERSEN 2,386,469
CHUCK
Filed Jan. 10, 1944 2 Sheets-Sheet 1
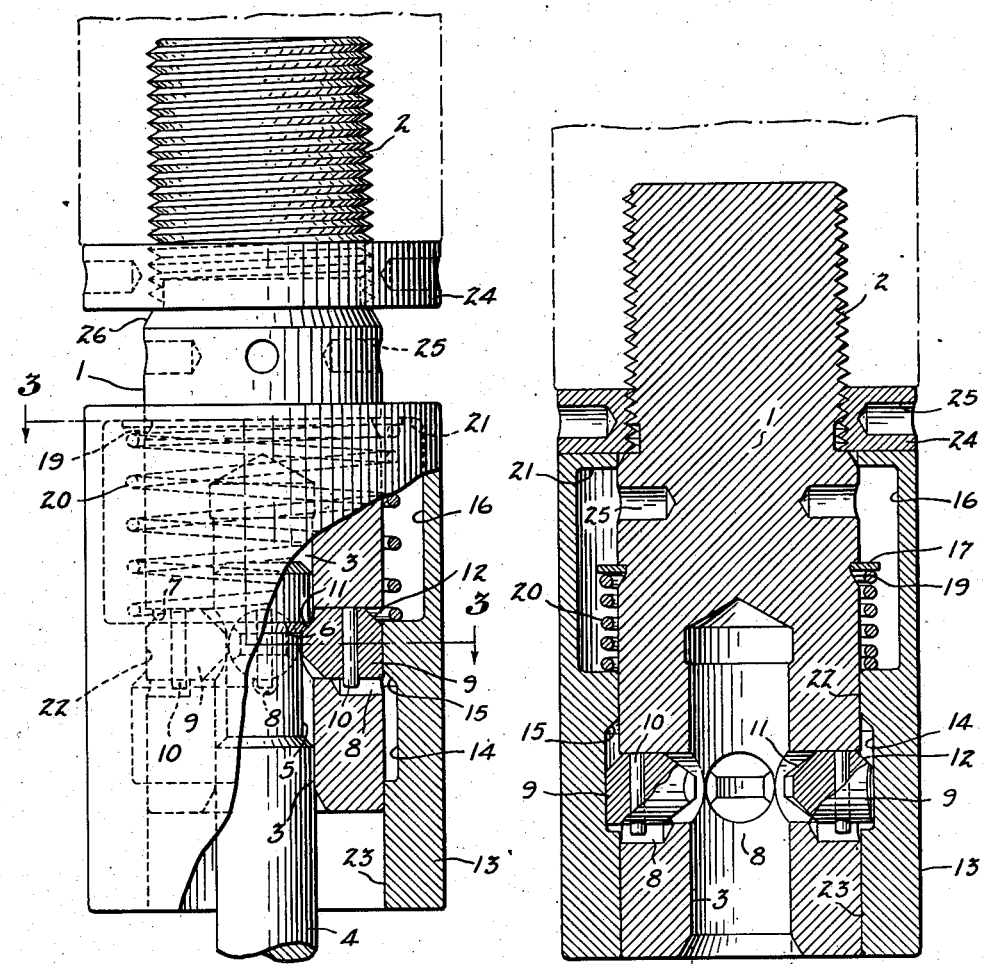
Fig.1
Fig.2
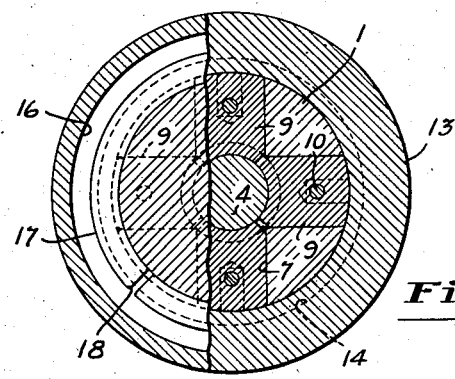
Fig.3
INVENTOR.
Norman Hilbert Iversen
BY
Evans + McCoy
ATTORNEYS Oct. 9, 1945.  N. H. IVERSEN  2,386,469
CHUCK
Filed Jan. 10, 1944  2 Sheets-Sheet 2
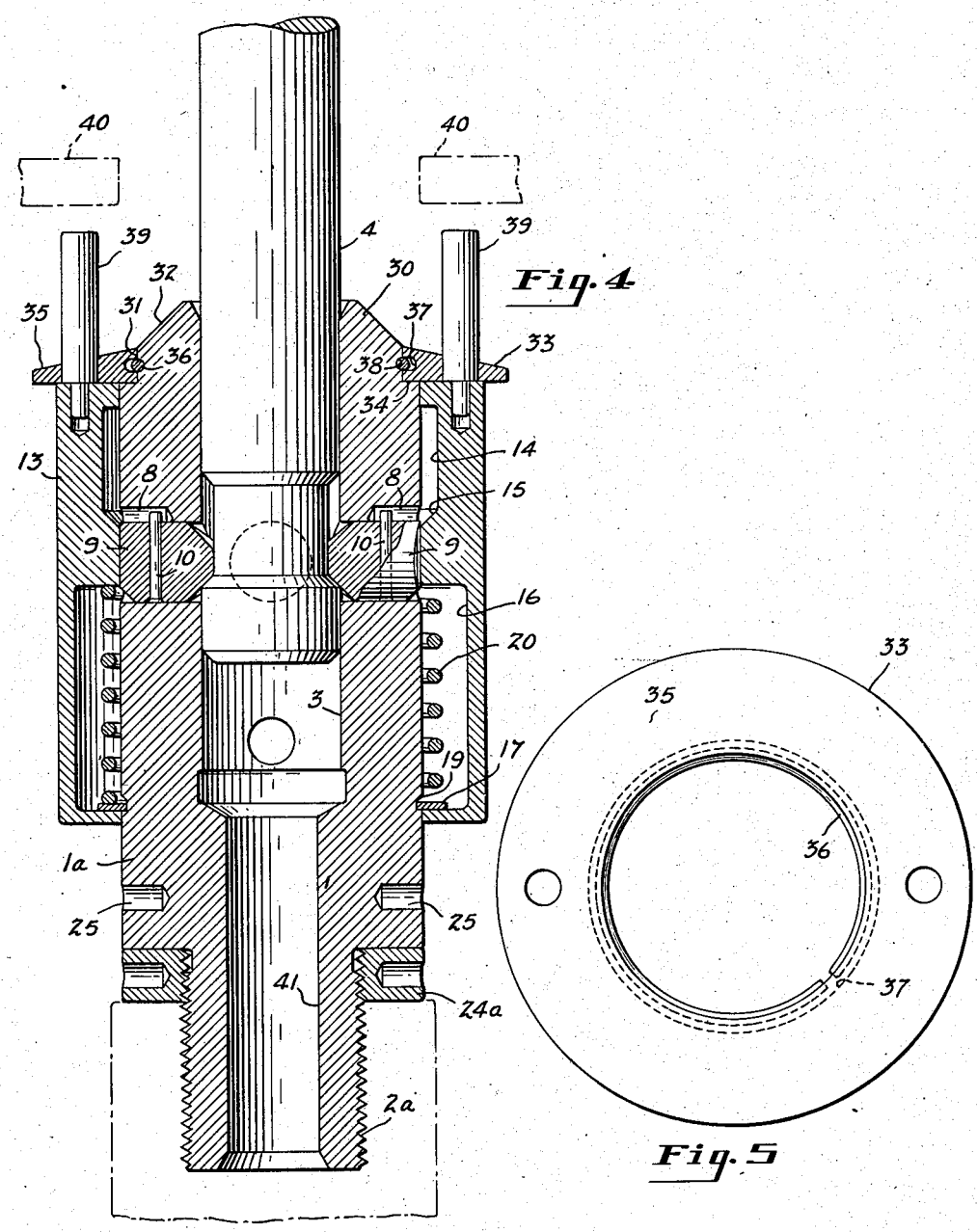
INVENTOR.
Norman Hilbert Iversen
BY
Evans & McCoy
ATTORNEYS Patented Oct. 9, 1945

2,386,469

UNITED STATES PATENT OFFICE 2,386,469

CHUCK

Norman Hilbert Iversen, Birmingham, Mich., assignor, by mesne assignments, to Shatterproof Glass Corporation, Detroit, Mich., a corporation of Delaware Application January 10, 1944, Serial No. 517,688

8 Claims. (Cl. 279—74)

This invention relates to tool chucks or holders and particularly to chucks suitable for securing a tool, such as a broach, to an actuating head.

The present invention has for an object to provide a chuck having a cylindrical body member of uniform diameter and an actuating sleeve that fits upon the cylindrical body member and a sleeve actuating spring that is housed within the sleeve.

A further object of the invention is to provide a chuck in which the working parts are protected against fouling by the entry of chips from the work.

With the above and other objects in view, the invention may be said to comprise the chuck as illustrated in the accompanying drawings hereinafter described and particularly set forth in the appended claims together with such variations and modifications thereof as will be apparent to one skilled in the art to which the invention pertains.

Reference should be had to the accompanying drawings forming a part of this specification in which Fig. 1 is an axial section through the chuck showing the same in clamping position;

Fig. 2 is an axial section showing the chuck in releasing position;

Fig. 3 is a section taken on the line indicated at 3—3 in Fig. 1;

Fig. 4 is an axial section showing a chuck of the present invention as modified for use as a puller applied to the lower end of a vertically movable broach; and Fig. 5 is a top plan view of the chip deflecting shield.

Referring to the accompanying drawings the chuck of the present invention has a body member 1 that is of cylindrical form and of uniform diameter throughout its length except for a threaded end portion 2 by means of which the body member may be attached to a suitable actuating head. At its opposite end the body member 1 has an axial tool receiving bore 3 that is adapted to receive a tool shank 4 that is provided with a circumferential groove 5 formed with beveled edges 6. For convenience the tool receiving and attaching ends of the chuck are referred to herein as "outer" and "inner" ends, respectively. Adjacent its outer end the body member 1 has circumferentially spaced radial bores 7 that extend from the periphery thereof to the tool receiving bore 3. Each bore 7 has a key groove 8 formed in the wall thereof, this groove extending inwardly from the periphery of the body member and terminating short of the axial bore 3.

Tool engaging dogs 9 are slidably mounted in the bores 7, these dogs being of cylindrical form to fit in the bores and carrying key pins 10 that engage in the grooves 8. The dogs 9 which may be cut to length from cylindrical bar stock, are slightly longer than the bore 7 so that when their outer ends are flush with the periphery of the body member 1, the inner ends are projected into the axial bore 3 and when their inner ends are flush with the wall of the bore 3 their outer ends project slightly past the cylindrical surface of the body member 1. The dogs 9 have beveled inner ends 11 that are adapted to engage the beveled edges 6 of the groove 5 in the tool shank and at their outer ends, each of the dogs 9 has a beveled inner shoulder 12.

An actuating sleeve 13 is slidably mounted upon the cylindrical body member 1 and this sleeve is provided adjacent its outer end with an internal circumferential dog receiving recess 14 that has a beveled inner edge 15 that is adapted to engage the beveled shoulders of the dogs to simultaneously force the dogs radially inwardly into tool engaging position. When the sleeve 13 is in its innermost position the recess 14 is registered with the bores 7 and the dogs 9 can be forced radially outwardly into the recess 14 by a pull on the tool shank 4 to permit removal of the tool. When the sleeve is moved outwardly from its innermost position the shoulder 15 of the sleeve engages the shoulders 12 of the dogs and forces them radially inwardly into tool clamping position. At its inner end the sleeve 13 is provided with an internal circumferential recess 16 that is longer and deeper than the recess 14 and which provides a housing for a stop ring 17 that is formed of resilient metal and provided with a split 18 so that it is adapted to be expanded sufficiently to slide over the cylindrical body member 1 and snap into a groove 19 formed in the body member.

A spring 20 is interposed between the stop ring 17 and the outer end of the recess 16 and acts to press the sleeve 13 downwardly toward clamping position. The sleeve 13 has an inner end portion 21 that has a sliding fit on the cylindrical body member 1 and which is engageable with the stop ring 17 to limit the outward movement of the sleeve 13. The sleeve 13 also has a bearing portion 22 between the recesses 14 and 16 and a bearing portion 23 at its outer end. The portions 21, 22 and 23 of the sleeve have a sliding fit upon the cylindrical body member 1 to guide the sleeve in its movement on the body member. The sleeve 13 may be a casting with the recesses 14 and 16 cored therein so that the cylindrical bore thereof is the only surface that need be machined.

A locking and positioning nut 24 may be screwed upon the threaded inner end 2 of the body member, and this nut may also serve as a stop for the sleeve, being spaced from the snap ring 17 a distance sufficient to allow the desired axial inward movement of the sleeve 13. By placing the actuating spring 20 within the sleeve the space between the inner end of the sleeve and the nut 24 is left unobstructed and this portion of the body member 1 may be provided with spanner wrench holes 25 to facilitate the attachment of the body member to an actuating head and the adjustment of the body member with respect to such head.

The stop ring 17 and spring 20 are assembled in the recess 16 of the sleeve 13 before the sleeve 13 is placed upon the body member 1. The split 18 in the ring 17 permits the ends to be sprung laterally enough to permit the ring to be inserted endwise into the recess 16 between the inner end of the spring 20 and the inner end of the recess 16. The dogs 9 are inserted in the radial bores 7 before the sleeve 13 is placed upon the body member 1, the grooves 8 limiting the inward movement of the dogs. The body member 1 is preferably provided with a tapering shoulder 26 at the base of the threaded portion 2 that serves to expand the ring 17 as the sleeve 13 is moved onto the body member 1 from the inner end thereof. The movement of the sleeve 13 outwardly on the body member 1 is not impeded by the dogs 9 since the outer end of the sleeve will engage the shoulders 12 of any of the dogs 9 projecting past the periphery of the member 1 and move the dogs inwardly. During the outward movement of the sleeve 13 the ring 17 first slides over the tapering shoulder 26, then outwardly over the cylindrical periphery of the body member and snaps into the groove 19. The wall at the outer side of the groove 19 is preferably tapered so that the ring and sleeve may be removed from the body member 1 by outward pressure exerted on the sleeve.

In some broaching machines the broaching tool has a downward cutting stroke and is actuated by a "pull down" ram positioned beneath it. When the chuck of the present invention is employed to attach a broaching tool to a "pull down" ram, it is desirable that means be provided for preventing the fouling of the working parts of the chuck by chips falling from the work. In Figs. 4 and 5 of the drawings a chuck suitable for use with a "pull down" ram is shown. This chuck includes the same elements as the chuck illustrated in Figs. 1 to 3 and the parts which are identical are indicated by the same reference numerals as in Figs. 1 to 3. In Figs. 4 and 5 the body member 1ª is made longer than the body member 1 and is provided with an extension 30 of reduced diameter that has a cylindrical portion 31 and a tapering end portion 32. A chip deflecting shield in the form of a ring 33 fits upon the cylindrical portion 31 and seats against a shoulder 34 at the inner end of the cylindrical portion. The thickness of the ring 33 at its internal periphery corresponds to the height of the cylindrical receiving portion 31 and the outer or top face 35 of the ring slants from its inner periphery toward its outer periphery. The external diameter of the ring 33 is preferably somewhat greater than the diameter of the sleeve 13, so that chips falling upon the end of the chuck will slide outwardly over the conical surfaces 32 and 35 and drop clear of the sleeve 13.

The ring 33 is detachably secured to the body member 1ª by means of a resilient expansible ring 36 that is mounted in a groove 37 formed in the interior face of the ring 33. The ring 36 is split to permit it to expand and contract and is expanded into the groove 37 by engagement with the tapered end 32 when the ring 33 is placed upon the cylindrical portion 31 and snaps into a groove 38 in the cylindrical face 31 when the ring 33 is positioned upon the shoulder 34.

In broaching machines it is common practice to automatically release the tool by engagement of a movable part of the chuck with a stop member mounted alongside the tool. When a chuck such as shown in Figs. 1 to 3 is used the stop may engage directly with the end of the sleeve. In the modification shown in Fig. 4, however, the sleeve 13 does not project beyond the body member, and in order to provide for automatic release of the tool, the sleeve 13 may be provided with axially extending pins 39 attached to the upper end thereof which extend through openings in the ring 33 and which are adapted to engage with suitable stop members 40 alongside the tool 4. In order to prevent chips from accumulating in the tool receiving socket, the body member 1ª is preferably provided with a bore 41 that extends through the threaded end 2ª thereof and connects with the tool receiving bore 3. It is not essential that the adjusting nut be disposed in the path of the sleeve 13 and in Fig. 4 the threaded attaching end 2ª is of relatively small diameter and the external diameter of the nut 24ª is the same as that of the body member 1ª.

It is to be understood that variations and modifications of the specific devices herein shown and described for purposes of illustration, may be made without departing from the spirit of the invention.

What I claim is:

1. A chuck comprising a cylindrical body member having a tool receiving outer end and an axial tool receiving bore opening to said outer end, said body member having a circumferential groove and a radial opening between the tool receiving end thereof and said groove, said groove having an inner wall perpendicular to the axis of the body and an outer wall that tapers toward the inner wall, a tool engaging dog slidably mounted in said opening, a resilient expansible stop ring mounted in said groove, a dog actuating sleeve having a cylindrical bore slidably fitting upon said body member outwardly of the stop ring, said sleeve having an internal recess adapted to receive the outer end of said dog and a dog engaging cam portion at the inner end of said recess, said sleeve having a circumferential recess into which said stop ring projects, the inner end of said sleeve having a sliding fit on said body member inwardly of the stop ring and engageable with the stop ring, and a coil spring in said circumferential recess and interposed between the stop member and the outer end of said recess, the movement of said sleeve by said spring being limited by said stop ring, said spring, stop ring and sleeve being removable as a unit over the outer end of said body.

2. A chuck comprising a body member of cylindrical form and of uniform diameter except for an attaching portion at its inner end, said body member having an axial tool receiving bore and a radial opening to said axial bore, axially spaced stop members attached to said body member inwardly of said radial opening; a dog slidably mounted in the radial opening, a sleeve slidably mounted on said body member, said sleeve having axially spaced circumferential internal recesses one to receive the outer end of the dog and the other to receive the outer of said stop members, said sleeve having cylindrical internal surfaces at the ends thereof and between said recesses that fit the cylindrical surface of said body member, and a coil spring surrounding said body member and positioned in the inner recess of said sleeve between the outer stop member and the outer end of the recess.

3. A chuck comprising a body member of cylindrical form and having a threaded attaching portion at its inner end, said body member having an axial tool receiving bore and a radial opening to said bore, said body member having a circumferential groove spaced from its threaded inner end and spanner sockets between said groove and its threaded end, a dog slidably mounted in said opening, an expansible resilient stop ring mounted in said groove, a sleeve on said body member, said sleeve having spaced circumferential recesses one to receive said dog and the other to receive said stop ring, said sleeve having an inner end portion slidably fitting upon said cylindrical body and engageable with said stop ring, said sleeve having a portion between said recesses engageable with the dog to move the same inwardly and an outer end portion fitting upon the body member, a spring within the inner of said recesses interposed between said stop ring and the outer end of the recess, and a collar threaded upon the inner end of the body member which limits the inward movement of the sleeve.

4. A chuck comprising a cylindrical body member having a tool receiving socket at one end, radially movable locking members mounted in said body member and engageable with the tool, means for actuating said locking members comprising a sleeve slidably mounted on said body member, a spring interposed between said body member and sleeve and housed within the sleeve for holding said sleeve in locking position and an annular shield attached to the tool receiving end of the body member and overlying the adjacent end of said sleeve.

5. A chuck comprising a body member having a tool receiving socket at one end, locking members carried by said body member and engageable with said tool, means comprising a sleeve slidably mounted on the body member for actuating said locking members, and an annular shield of greater diameter than said sleeve attached to the tool receiving end of said body member and overlying the adjacent end of said sleeve.

6. A chuck comprising a body member having a tool receiving socket at one end, locking members carried by said body member and engageable with said tool, means comprising a sleeve slidably mounted on the body member for actuating said locking members, an annular shield of greater diameter than said sleeve attached to the tool receiving end of said body member and overlying the adjacent end of said sleeve and axially extending pins attached to said sleeve and projecting past said shield.

7. A chuck comprising a body member having a tool receiving socket at one end, locking members carried by said body member and engageable with said tool, means comprising a sleeve slidably mounted on the body member for actuating said locking members, an annular shield of greater diameter than said sleeve attached to the tool receiving end of said body member and overlying the adjacent end of said sleeve, said shield having circumferentially spout openings, and axially extending pins attached to said sleeve, slidable in said openings and projecting past said shield.

8. In a tool clamping clutch, a cylindrical body member having a circumferential groove, one side wall of which provides a stop surface substantially perpendicular to the axis of said member and the opposite side wall of which tapers toward the stop wall, a resilient split ring slidable on said body member and adapted to snap into said groove, a cylindrical sleeve slidably fitting upon said body member, said sleeve having a circumferential internal recess to receive said ring and having shoulders at opposite ends of said recess, one of said shoulders being engageable with said ring on the side thereof facing said stop wall to slide the ring over the tapered wall of the groove onto the cylindrical surface of the body member, and a spring coiled around said body member, positioned in said sleeve recess and interposed between said ring and the other of said shoulders.

NORMAN HILBERT IVERSEN.